United States Patent [19]

Allinquant

[11] Patent Number: 4,629,059
[45] Date of Patent: Dec. 16, 1986

[54] LOAD HANDLING INSTALLATIONS

[76] Inventor: Fernand M. Allinquant, 10712 Barnwood La., Potomac, Md. 20854

[21] Appl. No.: 664,412

[22] Filed: Oct. 24, 1984

[30] Foreign Application Priority Data

Nov. 3, 1983 [FR] France .................................. 83 17458

[51] Int. Cl.⁴ .................... B65G 37/00; B65G 13/075; B65G 13/10
[52] U.S. Cl. ............................... 198/463.3; 193/35 R; 193/35 A; 193/35 SS; 193/36
[58] Field of Search ............... 193/35 R, 35 A, 35 SS, 193/36; 198/470, 429, 430, 463.3, 345

[56] References Cited

U.S. PATENT DOCUMENTS

| 1,641,998 | 9/1927 | Von Du Horst | 193/35 A X |
| 2,470,795 | 5/1949 | Socke | 198/429 X |
| 2,993,582 | 2/1967 | Souser | 198/470 |
| 3,096,871 | 7/1963 | Anderson | 198/470 X |
| 3,110,383 | 11/1963 | Holben | 193/36 X |
| 3,710,687 | 1/1973 | Rench | 91/363 R |
| 3,904,182 | 9/1975 | Allinquant et al. | 267/64 R |
| 4,089,512 | 5/1978 | Alliquant et al. | 267/65 R |
| 4,218,956 | 8/1980 | Uno et al. | 91/363 R |
| 4,325,476 | 4/1982 | Eddy | 198/470 X |
| 4,527,937 | 7/1985 | Tomasello, Jr. | 193/35 A |

FOREIGN PATENT DOCUMENTS

| 1296574 | 5/1969 | Fed. Rep. of Germany | 198/470 |
| 1925556 | 5/1969 | Fed. Rep. of Germany | |
| 0165606 | 12/1981 | Japan | 193/35 A |
| 1175648 | 12/1969 | United Kingdom | 198/470 |

Primary Examiner—Joseph F. Peters, Jr.
Assistant Examiner—Mary Beth O. Jones
Attorney, Agent, or Firm—Staas & Halsey

[57] ABSTRACT

A roller conveyor is designed for transferring a load from a departure station where the load sets off to an arrival station where it is stopped by a buffer.

The latter comprises a stop plate mounted on a shock absorber associated with a position detector, to ensure that the load and its support are stopped in the correct position and that they are displaced from the arrival station of the conveyor towards the departure station of another conveyor.

3 Claims, 5 Drawing Figures

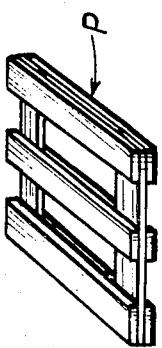
FIG.:2 (PRIOR ART)
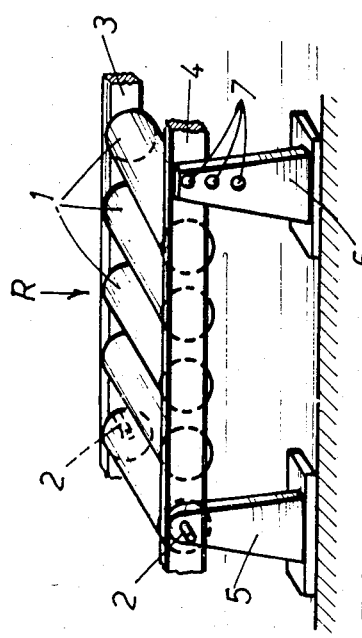
FIG.:1 (PRIOR ART)
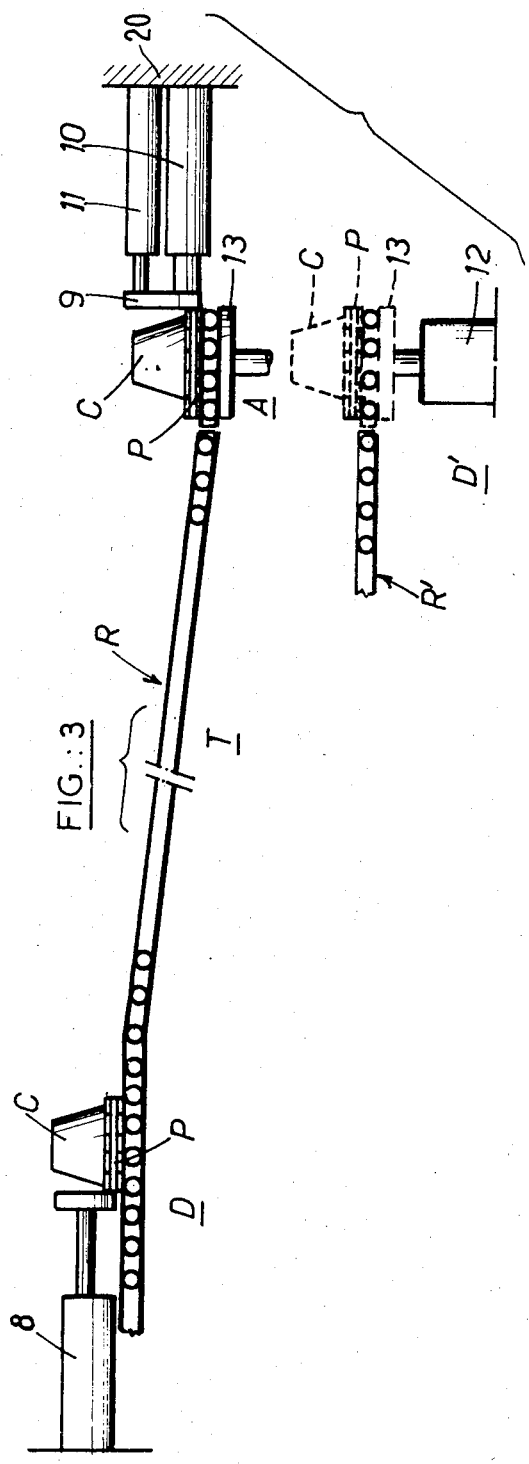
FIG.:3

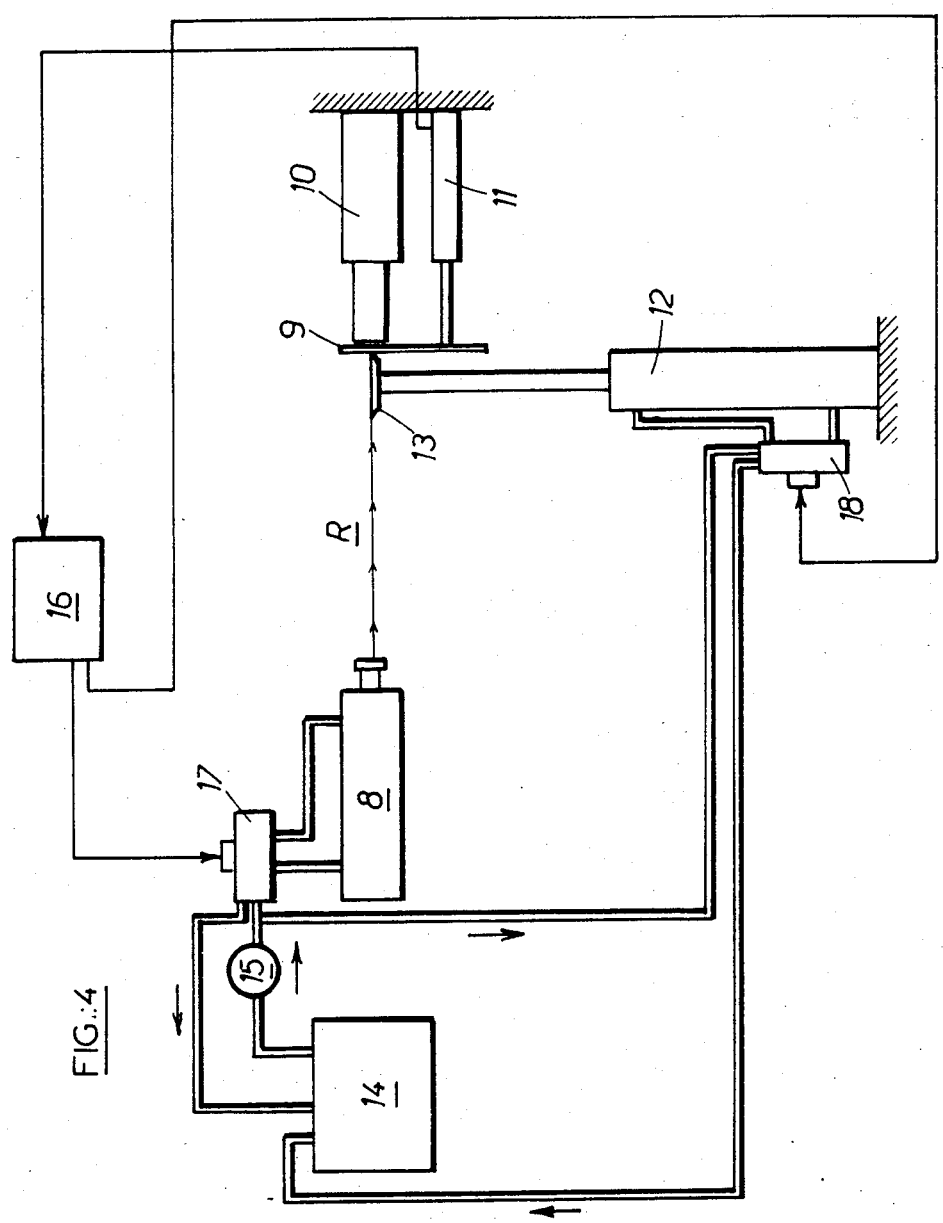

4,629,059

LOAD HANDLING INSTALLATIONS

BACKGROUND OF THE INVENTION

The present invention relates to improvements made to conventional handling installations for automatically transporting loads, particularly to roller conveyors for transferring pallets, trays or other load-carrying elements from one point to another.

To clarify ideas, FIGS. 1 and 2 of the attached drawings respectively illustrate diagrammatically a roller conveyor and a pallet, both of a conventional type.

FIG. 1 shows a kind of metal carpet consisting of a succession of cylinders or rollers 1 rotating freely about their axis 2—2 and maintained in virtually tangential proximity to one another between two parallel longitudinal members 3, 4 which receive the axles of the rollers and which are themselves supported by legs 5, 6. The latter or at least some of them have orifices 7 located at different heights for receiving a roller axle, in order to allow horizontal adjustment or a more or less pronounced inclination of the rolling track R which the rollers 1 as a whole constitute for a pallet P, such as that illustrated in FIG. 2.

Where a horizontal rolling track or conveyor R is concerned, the load-carrying pallet P is propelled under the action of an initial impulse force which, if appropriate, is repeated occassionally to allow for friction. Where a rolling track R inclined in a downward direction is concerned, the difference in level between its ends could be sufficient to ensure the translation of the pallel P as a result of gravity, but if this were not sufficient, it would be possible, here too, to resort to propulsive impulses.

FIG. 3 of the attached drawings illustrates an installation of this type. At the departure station D where the rolling track R has a horizontal segment, a jack 8, which can be controlled by a computer or a coder at specific moments, applies an initial impulse to the load C carried by the pallet P; the latter, set in motion in this way, continues its path over the inclined transfer portion T of the rolling track and ends at the arrival station A, where the pallet P comes up against a stop plate 9, before being removed or transferred to the departure station D' of another rolling track R', as illustrated diagrammatically at the bottom of FIG. 3. This second departure station D' can be provided with a jack 8a similar to the jack 8 at the original departure station D.

SUMMARY OF THE INVENTION

The pallet P and its load C, which is more or less fragile and which can be of varied shape and weight, should be stopped at the arrival station A with care, to ensure the safety of the load and its correct positioning under the best possible conditions.

According to the present invention, this object is achieved as a result of the mounting of the stop plate 9 on a shock absorber 10 associated with a position sensor 11, each device advantageously being of the telescopic type and operatively involving a pneumatic spring device.

BRIEF DESCRIPTION OF THE DRAWINGS

FIG. 1 is a perspective view of a portion of a conventional rolling track;

FIG. 2 is a perspective view of a conventional pallet;

FIG. 3 is a side view of a rolling track according to the present invention;

FIG. 4 is a diagrammatic view of the hydraulic network used in the rolling track according to the present invention shown in FIG. 3.

DETAILED DESCRIPTION OF THE PREFERRED EMBODIMENT

Figure 5:
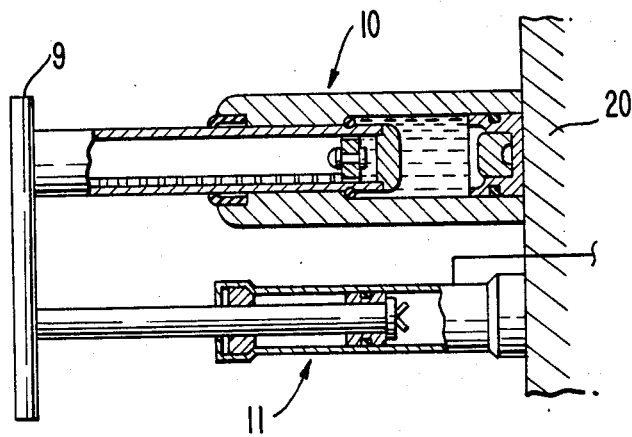
FIG. 5 is a side, cross-sectional view of the shock absorber and pressure sensor shown in FIGS. 3 and 4.

To put the present invention into practice, advantageous use can be made:

as regards the shock absorber 10, of a device with a pneumatic spring damped by means of a hydraulic flow, such as that described in U.S. Pat. No. 3,904,182, as regards the position sensor 11, of a device with a pneumatic spring and with an end-stroke electrical contactor, such as that described in U.S. Pat. No. 4,089,512.

The shock absorber 10 and the position sensor 11 are assembled parallel to one another on a fixed support 20 and have compatible strokes. If a load or a succession of loads arrives at a certain speed at the shock absorber 10, the latter progressively brakes the displacement up to a complete stop (with or without oscillations, depending on the setting of the shock absorber 10 and the acceleration of the moving loads) while, at the same time, position sensor 11 detects the exact position reached. The position detector 11 then emits a signal indicating the correct positioning of the load at the arrival station A.

This signal can control a path-change jack 12: thus, for example, by retracting, the jack 12 can drive a movable element 13 of the rolling track R, on which the pallet P and its load C rests, in order to bring them in line with another rolling track or conveyor R'.

Finally, by means of the shock absorber 10 and the position sensor 11, a safety facility for safeguarding the transported loads and the possibility of transmitting position indications are obtained at the same time. It goes without saying that, if the loads are sufficiently light, it is merely necessary to use only electrical-contact pneumatic springs in the position sensor 11, without departing from the scope of the present invention.

FIG. 4 illustrates a possible operating diagram of the installation which has just been described, this diagram making use of a hydraulic fluid contained in a cistern or tank 14 and delivered by a pump 15 at a suitable pressure.

At the desired moment, a coder or a computer 16 controls a solenoid valve 17 which in turn controls a jack 8 imparting to the load the starting impulse which sends it along the conveyor R. When the load is received in the correct position at the end of the latter, the position detector 11 transmits this indication to the coder 16 which then transmits an order to a second solenoid valve 18 controlling the path-switching jack 12.

I claim:

1. A computer- or coder-controlled load handling installation, such as roller conveyor equipment designed to transfer a load from a departure station from which the load sets off to an arrival station at which the load is stopped, comprising:

(a) a buffer assembly at said arrival station for smoothly stopped said load as the load reaches the arrival station, said buffer assembly including a fixed support and a yieldable stop plate adapted to be engaged by said load upon its arrival at said arrival station;

(b) a shock absorber including spring means and damping means and a position sensor associated with the shock absorber on which said stop plate is mounted, wherein said shock absorber and said position sensor each includes a telescopic apparatus operatively involving a pneumatic spring device, and wherein said buffer assembly is adapted to bring said load to a smooth stop, is responsive to the position of said stop plate detected by the position detector which emits a signal when said stop plate is in a predetermined position for disposal of said load; and (c) load disposal means under the control of said position sensor for shifting said load from said arrival station of said conveyor to a second departure station of a further conveyor.

2. Installation as claimed in claim 1, wherein said pneumatic-spring device of the shock absorber is damped by a means of a hydraulic flow.

3. Installation as claimed in claim 1, wherein said pneumatic-spring device of the position sensor comprises an end-stroke electrical contractor.

* * * * *